Figure 1:
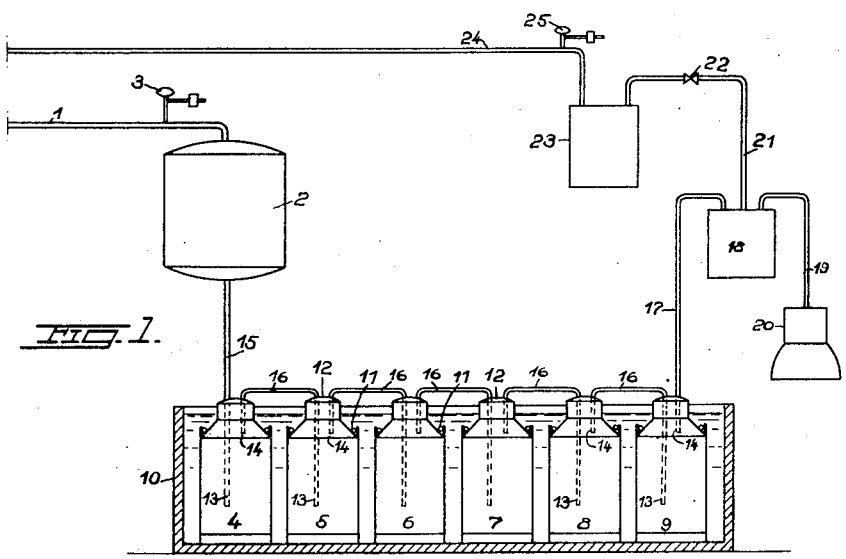

Inventors:
Eric Georg Redin
Karl Erik Olander
Zern Arne Elias Johansson
by W. Bayard Jones
Attorney

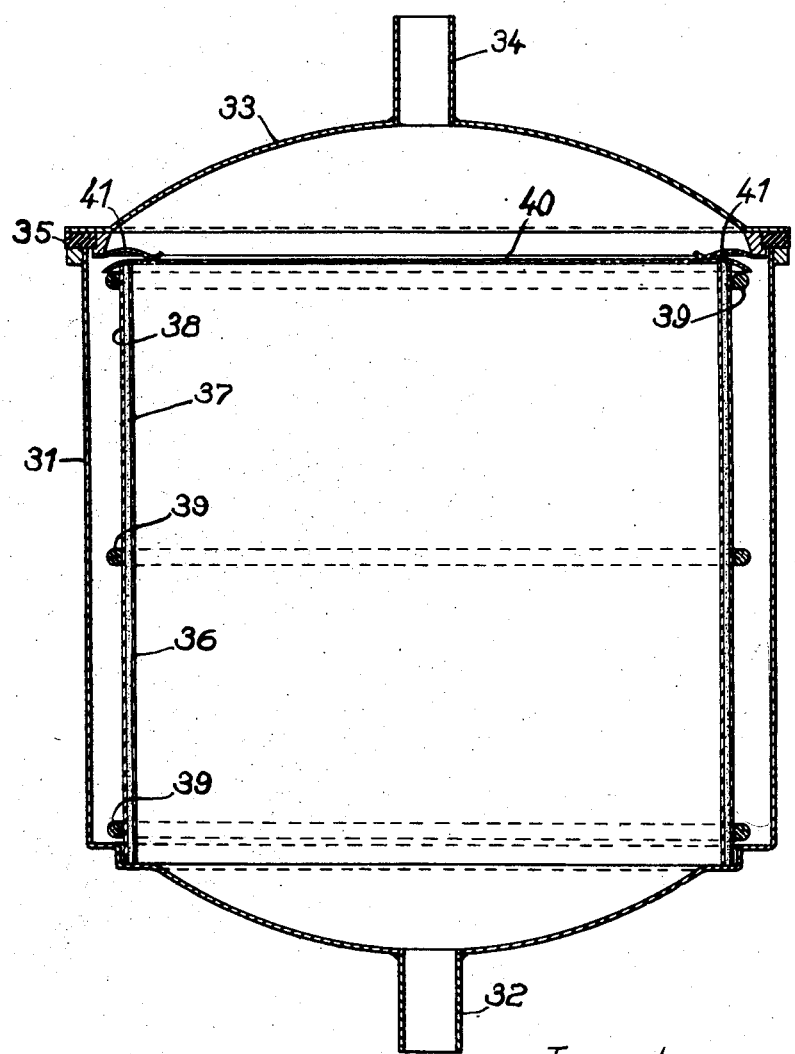

Patented July 15, 1952

2,603,396

UNITED STATES PATENT OFFICE 2,603,396

APPARATUS FOR FILLING MILK CANS BY VACUUM, WITH MEANS FOR STRAINING AND COOLING SAID MILK

Eric Georg Redin, Karl Erik Olander, and Zern Arne Elias Johansson, Norrkoping, Sweden, assignors to Aktiebolaget Manus, Norrkoping, Sweden, a company of Sweden Application June 22, 1948, Serial No. 34,464
In Sweden June 26, 1947

2 Claims. (Cl. 226—19)

The present invention relates to an improvement in machine milking plants of the type in which there is provided in the cow house along the row or rows of stalls for the cows, in addition to a stationary vacuum conduit in which the vacuum necessary for the operation of the teat cup units is maintained, also a stationary milk conduit in which suction is maintained, and to which the milk tubes from the teat cup units are connected during the milking operation. For emptying the milk from the said milk conduit which usually leads to a separate milk chamber, use has hitherto been made of a so-called automatic releaser, that is, an automatic discharge device which consists of a vessel that is divided into two chambers, into the upper chamber of which the stationary milk conduit opens and which is continuously maintained under vacuum, while the lower chamber which is separated from the upper chamber by means of a valve and which is provided at its lower end with an outflow valve, is maintained under a pulsating vacuum. When the vacuum is equal in both chambers, the valve between the chambers is opened, so that the milk flows from the upper chamber to the lower chamber, but when atmospheric pressure is admitted into the lower chamber, the valve between the two chambers closes, while the outflow valve in the lower chamber opens so that the milk is allowed to flow out from said chamber. The outflowing milk is collected in milk cans and is then emptied into a strainer, after which the milk is raised to a plane cooler in order to be cooled and is then allowed to flow down into milk transport cans placed below the cooler. Another way is to allow the milk to flow from the automatic releaser directly to a strainer and thence to a plane cooler and from the cooler to a distributor which distributes the milk to the milk transport cans. A third way is to allow the milk to flow from the automatic releaser to a strainer, and from the strainer to a distributor which distributes the milk to a number of milk transport cans which are placed in a cooling basin, and which are exchanged as soon as they have been filled, and in this case stirrers are sometimes used for stirring the milk in the cans, thereby to facilitate and accelerate the cooling of the milk. In all these cases the releaser plant requires the service of one person in the milk chamber during the milking operation for attending to the milk transport cans and moving the same, and in addition, the washing of the automatic releaser and of the plane cooler or the stirrer, when the milking has been finished, involves considerable work. Another disadvantage is that the milk comes in contact with the air during the straining and cooling and during the handling thereof in the milk chamber. The automatic releaser, and the necessity of using for said releaser some apparatus, such as a separate releaser pump, in order to produce a pulsating vacuum, also increases the cost of installation of the plant as well as the cost of operation of the same.

It is an object of the present invention to eliminate these difficulties and to provide a machine milking plant in which the straining and cooling of the milk, and the filling of the milk into the milk transport cans, are effected fully automatically and do not require the service of an attendant in the milk chamber.

With this object in view the present invention is principally characterized by there being connected in the suction conduit intermediate the stationary milk conduit and the vacuum pump which maintains suction in said milk conduit, a closed strainer apparatus which is connected to the milk conduit, so that the milk flows from said conduit into the strainer apparatus, and a group of closed milk transport cans which are cooled by means of a cooling apparatus, and which are connected with one another and are connected, on the one hand, with the strainer apparatus and, on the other hand, with the vacuum pump, in such manner that due to the suction produced by the vacuum pump in the strainer apparatus and in the cans, the milk will flow from the strainer apparatus to the first can of the group, and from said first can to the other cans of the group, according as the cans become filled in this way with milk to the desired level. With this arrangement, therefore, the milk will be drawn from the teats of the cows through the teat cup units to the stationary milk conduit, and from this conduit to the strainer apparaus and thence to the first transport can of the group of such cans, which will become filled one after another, and simultaneously, the milk will be cooled. Consequently, the milk is filled into the transport cans without coming in contact with the outside air, and the entire course of operation takes place without any attendance whatever being required in the milk chamber during the milking operation.

A constructional form of a machine milking plant according to the invention is illustrated by way of example in the accompanying drawings, in which Fig. 1 shows diagrammatically the apparatuses in the milk chamber, and Fig. 2 shows a constructional form of a strainer apparatus in vertical section.

Referring to Fig. 1, 1 denotes the stationary milk conduit which is mounted along the row or rows of stalls in the cow house, and which extends into the milk chamber where it is connected to a closed strainer apparatus 2, a preferred construction of which will be described here below. 3 denotes a safety valve mounted on the milk conduit 1 and which serves to maintain a suitable vacuum in said conduit.

4, 5, 6, 7, 8 and 9 denote milk transport cans which are placed in a suitable cooling apparatus which, in the instance illustrated, is shown as a cooling basin 10 filled with water at 0° C., cooled for instance by means of ice or a cooling machine. The cans 4 to 9, inclusive, are retained in their proper positions in the basin in a well-known manner by means of bars 11 which are placed over the handles of the cans and are locked to the walls of the basin in any suitable manner. All of the cans are provided with tight-fitting covers 12, and two tubes 13 and 14 or the like pass down through each such cover. In each can the tube 13 is the inflow tube and reaches to a short distance from the bottom of the can, while the tube 14 constitutes a suction tube and its lower end is located at the normal level of filling of the can. The tube 13 of the first can 4 is connected through a pipe or a flexible tube 15 with the strainer apparatus 2, so that milk flows from said apparatus down into the can 4. The suction tube 14 of each can is connected through a pipe or a flexible tube 16 with the inflow tube 13 of the next can of the group to form a siphon-like conduit between the cans, and the suction tube 14 of the last can 9 is connected through a conduit 17 with a vacuum equalizing vessel 18 which in its turn communicates through a conduit 19 with the vacuum pump 20. Accordingly, the said pump will maintain suction in all of the cans 4 to 9, inclusive, as well as in the strainer apparatus 2 and in the milk conduit 1. This suction causes the milk from the milk conduit 1 to flow into the strainer apparatus 2 and thence through the conduit 15 down into the can 4. As soon as the can 4 has been filled up to the end of the tube 14, any milk afterwards flowing into said can will be drawn through the tube 14 and flexible tube 16 over into the next can 5, and when this can has been filled, the filling of the next can 6 will begin, and so on. Meanwhile the milk in the transport cans is cooled. Due to the arrangement of the tubes 13 and 14 above described, the inflowing milk will be admitted into each transport can near the bottom thereof, and will thus effect stirring of the milk in the can, so that the cooling becomes efficient without a stirrer having to be used for this purpose. The number of transport cans should, of course, be suited to the number of the livestock and the quantity of milk. When the milking operation is finished, the milk is strained and cooled, and the transport cans are filled, without the milk having come in contact with the outside air during this operation, and without any attendance having been required.

From the vacuum equalizing vessel 18 a conduit 21 extends, in a manner well known per se, through a stopcock 22 to a second equalizing vessel 23, from which a vacuum conduit 24 leads to the cow house for the operation of the teat cup units. The conduit 24 is provided with a safety valve 25 for controlling the vacuum in the conduit.

Fig. 2 shows a vertical section through a strainer apparatus which is particularly suited to be used with a machine milking plant according to the invention. This strainer apparatus consists of a receptacle 31 provided with an outlet 32 at its bottom. The upper end of the receptacle is closed by a cover 33 having an inlet 34, there being provided a packing 35 between the receptacle and the cover so that the cover is tightly sealed against the upper rim of the receptacle. A perforated cylindrical strainer shell 36 rests upon the bottom of the receptacle. Before the strainer shell is inserted in the receptacle, some suitable filter material, such as a plane cotton or cellulose filter 37, is wound around the strainer shell, and upon such filter is wound a straining cloth 38, such as a metal wire netting, which is retained in position by putting rubber rings 39 around said straining cloth. The strainer shell is then inserted in the receptacle 31 and placed on the bottom thereof against which it is forced and held by springs 41 which are secured to the outer cover 33 and which press against an inner cover 40 which is secured to the strainer shell or is placed upon the same.

From the abovementioned milk conduit 1 the milk flows through the inlet 34 and is distributed by the inner cover 40 around the rim thereof, so that the milk will flow down along the outer side of the straining cloth 38. Owing to the suction which acts in a direction towards the outlet 32, the milk is drawn through the straining cloth 38 and through the cotton filter 37 which collects impurities in the milk, and through the strainer shell 36 into the interior thereof, after which the milk flows out through the outlet 32 to which the abovementioned conduit 15 is connected.

The strainer apparatus above described is exceedingly easy to handle and to clean. For this purpose it is merely necessary to remove the cover 33, after which the strainer shell is taken out of the receptacle, which may then be flushed clean. After removal of the rubber rings 39, the straining cloth 38 is unwound, the cotton filter 37 is removed, and the other parts are washed clean.

It will be understood from the above description that the invention provides a simple and practical machine milking plant, which offers the advantage, in the first place, that the milk does not come in contact with the air during the milking, straining and cooling operations. In addition, the milk is continuously strained and cooled during the milking, and is immediately ready for delivery as soon as the milking operation is finished. During the entire period of milking no attendance is required in the milk chamber, the straining and cooling proceeding automatically without requiring transports of milk cans or the like. The number of attendants required is thus reduced. Among the apparatuses in the milk chamber only the strainer and the covers of the transport cans need be washed. No automatic releaser and no releaser pump are required.

We claim:

1. A machine milking plant, comprising a plurality of teat cups, a stationary closed milk conduit communicating with said teat cups, a closed strainer apparatus having an inlet connected to said stationary milk conduit and an outlet, a plurality of closed milk transport cans connected to one another in a series, the first can of said series of milk transport cans being connected to the outlet of said strainer apparatus, a vacuum pump connected to the last can of the series of milk transport cans and adapted to maintain suction in said milk conduit and said strainer apparatus and said series of milk transport cans, said closed milk conduit, said closed strainer apparatus, and said closed milk transport cans all forming part of a closed system which is connected to said vacuum pump and which communicates with said teat cups, and which is sealed against the entry of air into said system during the milking operation, thereby causing milk to flow without coming into contact with the air from said milk conduit through said strainer apparatus to the first can of the series and thence through the other cans of said series in succession according as the cans become filled with milk to a predetermined level in said cans, and means encompassing said milk transport cans for cooling said cans and the milk flowing thereinto whereby the cooling of the milk will take place simultaneously with the distribution thereof into said cans, said cooling means comprising a container, a refrigerating liquid disposed within said container and encompassing and contacting said cans, and means to maintain said cans immersed within said liquid, against the tendency of said liquid to displace said cans upwardly.

2. A machine milking plant, comprising a stationary milk conduit, a closed strainer apparatus having an inlet connected to said stationary milk conduit and an outlet, a plurality of closed milk transport cans connected to one another in a series, each milk transport can of said series of such cans being provided with a tightly fitting cover having two tubes extending therethrough, one of said tubes being an inflow tube extending to a point adjacent the bottom of the can, and the second tube being an outflow tube and having its lower opening located at the normal level of filling of the can, said outflow tube of the cover of a preceding can of the series being connected with the inflow tube of the cover of the next can of the series by a suction tube to form a siphon-like conduit between such cans, the inflow tube of the first can of said series of milk transport cans being connected to the outlet of said strainer apparatus, a vacuum pump connected to the outflow tube of the last can of the series of milk transport cans and adapted to maintain suction in said milk conduit and said strainer apparatus and said series of milk transport cans, thereby causing milk to flow from said milk conduit through said strainer apparatus to the first can of the series and thence through the other cans of said series in succession according as the cans become filled with milk to a predetermined level in said cans, and means disposed outside of and encompassing said milk transport cans for cooling said cans and the milk flowing thereinto whereby the cooling of the milk will take place simultaneously with the distribution thereof to said cans.

ERIC GEORG REDIN.
KARL ERIK OLANDER.
ZERN ARNE ELIAS JOHANSSON.

REFERENCES CITED

The following references are of record in the file of this patent:

UNITED STATES PATENTS

| Number | Name | Date |
|---|---|---|
| 594,860 | Cushman | Dec. 7, 1897 |
| 806,697 | Morse | Dec. 5, 1905 |
| 1,048,597 | Shephard | Dec. 31, 1912 |
| 1,635,175 | Corwin | July 12, 1927 |
| 1,963,217 | Van Horn et al. | June 19, 1934 |
| 1,969,960 | Blum | Aug. 14, 1934 |
| 1,979,323 | Felesina et al. | Nov. 6, 1934 |
| 2,037,467 | Hapgood | Apr. 14, 1936 |
| 2,037,685 | Holden | Apr. 14, 1936 |
| 2,173,637 | Riedener | Sept. 19, 1939 |
| 2,184,761 | Wier | Dec. 26, 1939 |
| 2,202,163 | Mulford et al. | May 28, 1940 |
| 2,252,624 | Gilmore et al. | Aug. 12, 1941 |
| 2,380,771 | McDonald | July 31, 1945 |
| 2,547,797 | Torrey et al. | Apr. 13, 1951 |